(12) United States Patent
Belady et al.

(10) Patent No.: US 8,245,235 B1
(45) Date of Patent: Aug. 14, 2012

(54) ALLOCATING COMPUTER RESOURCES TO WORKLOADS AS A FUNCTION OF RELIABILITY INDICATIONS

(75) Inventors: Christian L. Belady, McKinney, TX (US); Thomas L. Vaden, Neshanic Station, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1506 days.

(21) Appl. No.: 11/742,582

(22) Filed: Apr. 30, 2007

(51) Int. Cl.
*G06F 9/46* (2006.01)
*G06F 11/00* (2006.01)
*G06F 15/18* (2006.01)

(52) U.S. Cl. ............... 718/104; 718/100; 714/1; 706/21

(58) Field of Classification Search ................... 718/104
See application file for complete search history.

(56) References Cited

U.S. PATENT DOCUMENTS

| 5,155,858 | A  | * | 10/1992 | DeBruler et al. ............. 718/105 |
| 2004/0267932 | A1 |   | 12/2004 | Voellm |
| 2005/0210469 | A1 |   | 9/2005  | Chung |
| 2005/0210470 | A1 |   | 9/2005  | Chung |
| 2005/0240934 | A1 | * | 10/2005 | Patterson et al. ............. 718/105 |
| 2006/0080268 | A1 |   | 4/2006  | Afeyan |
| 2007/0286089 | A1 | * | 12/2007 | Nasle et al. ................... 370/245 |
| 2008/0244568 | A1 | * | 10/2008 | Flemming et al. ............... 718/1 |

\* cited by examiner

*Primary Examiner* — Kenneth Tang

(57) ABSTRACT

A computer system has plural partitions for running respective workloads. Reliability-indicating events are monitored and the resulting data is used by a workload manager in allocating computer resources to workloads.

21 Claims, 1 Drawing Sheet

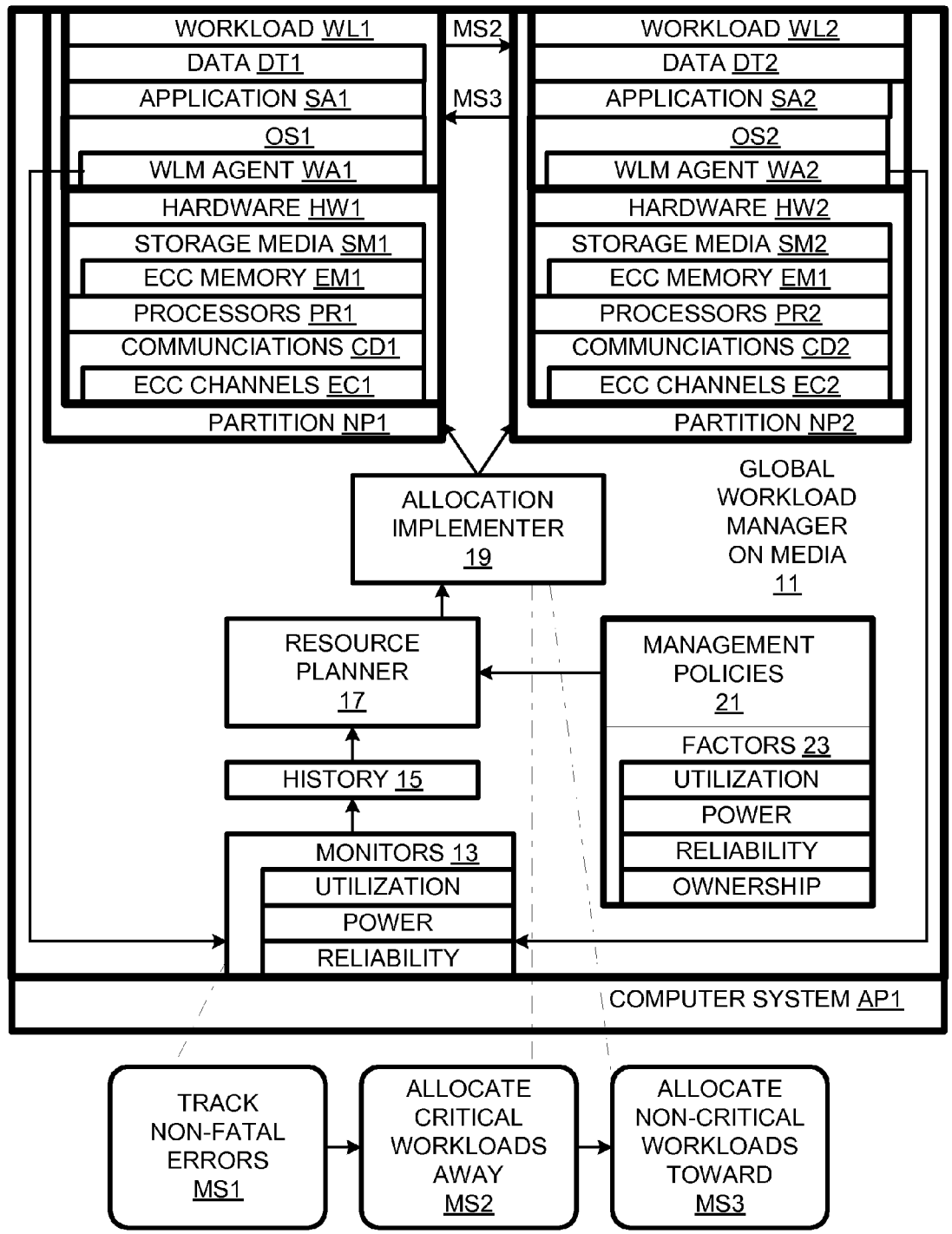

ALLOCATING COMPUTER RESOURCES TO WORKLOADS AS A FUNCTION OF RELIABILITY INDICATIONS

BACKGROUND OF THE INVENTION

Workload management is used to allocate dynamically computer resources to software workloads according to management policies, e.g., to enhance performance, reduce power consumption, and to respond to hardware failures. Allocating can involve moving hardware to partitions running a workload, or migrating a workload to another partition, or other action that defines what computer resources are consumed by a workload.

Herein, related art is described to facilitate understanding of the invention. Related art labeled "prior art" is admitted prior art; related art not labeled "prior art" is not admitted prior art.

BRIEF DESCRIPTION OF THE DRAWING

The FIGURE depicts implementations/embodiments of the invention and not the invention itself.

FIG. 1 is a combination schematic diagram and flow chart in accordance with embodiments of the invention.

DETAILED DESCRIPTION

A computer system AP1 includes partitions NP1 and NP2 for running respective workloads WL1 and WL2. In addition, either of these partitions or a manager partition can run a workload manager 11.

Partition NP1 includes processors PR1, storage media SM1, and communications devices CD1. Communications devices CD1 include error-correcting channels EC1. Communications devices CD1 can include network interface cards for an Ethernet network and host-bus adapters for storage array networks. Storage media SM1 includes error-correcting code (ECC) memory EM1, as well as other memory and disk-based storage. Storage media SM1 stores a workload WL1, including data DT1, a software application SA1, and operating system OS1 including a workload management agent WA1.

Partition NP2 includes processors PR2, storage media SM2, and communications devices CD2. Communications devices CD2 include error-correcting channels EC2. Communications devices CD2 can include network interface cards for an Ethernet network and host-bus adapters for storage array networks. Storage media SM2 includes error-correcting code (ECC) memory EM2, as well as other memory and disk-based storage. Storage media SM2 stores a workload WL2, including data DT2, a software application SA2, and operating system OS2 including a workload management agent WA2.

Computer-readable media including a computer-executable global workload manager 11 includes monitors 13, history 15, resource planner 17, allocation implementer 19, and management policies 21. Monitors 13 cooperate with workload management agents WA1 and WA2 to gather and compile data regarding resource utilization, power consumption, and reliability as indicated by non-fatal problems such as error rates.

For example, ECC channels EC1 and EC2 and ECC memories EM1 and EM2 can correct one-bit errors so that no loss of data occurs. Thus, one-bit errors do not have a significant impact on performance. Nonetheless, the occurrence of such errors is tracked by monitors 13. An error rate above a certain threshold can indicate a level of unreliability or predict a future failure. As such non-fatal error data is collected it is compiled in history 15 along with power and utilization data.

Resource planner 17 then plans an allocation of computer resources based on management policies. Management policies 21 can take several factors 23 into account such as utilization targets and power consumption limits. In addition, non-monitored factors, such as ownership can be considered. For example, workload WL1 may own a certain number of processors. In that case, workload WL1 will be allocated at least that number of processors unless workload WL1 allows workload WL2 to borrow them.

Management policies 21 can take partition reliability into account. If a partition or entire server suffers an excessive number of failures or recoverable errors, whether in data-handling components (such as processors, storage media, or communications devices) or non-data handling devices (such as power supplies and fans, it may not be a good host for critical applications. For example, if a partition of a component of a partition suffers excessive one-bit errors, the likelihood of an unrecoverable error or a failure increases. Accordingly, resource planner 17 can allocate priority workloads away from an unreliable partition. In some cases, such a migration would tax the resources of the destination partition, especially if it was already running a workload. To relieve this burden, a low priority workload can be migrated to the less reliable partition.

Method ME1, flow charted in FIG. 1 represents this scenario. Assume that an excessive number of one-bit ECC errors is detected on partition NP1. If workload WL1 is assigned a high priority by management policies 21, it can be migrated away from partition NP1 to partition NP2. Of course, it may not be the entire workload that is migrated; it may be just the application SA1, for example.

If the migration of the a critical workload to a partition burdens the resources of the destination partition, NP2, a low priority workload, e.g., workload WL2, or just application SA2 can be migrated to the unreliable partition NP1. While this may seem counterintuitive, it can allow the critical workload to continue operating at a high performance level, without terminating a secondary workload.

Herein, "software agents" are computer programs, and a computer "workload" is a program or set of programs. Herein, a "computer program" or more simply a "program" is an ordered set of instructions tangibly embodied in computer-readable storage media and interpretable and executable by a central processing unit. Herein, "program" does not encompass purely abstract ideas, natural phenomena, or laws of nature. A "program set" is a set of one or more programs. All programs described herein effect changes in state in computer-readable memory.

'Use rights", as the phrase is used herein, refers to a user's rights to use specific hardware resources. "Limited use rights" and "limited rights to use" and "right-to-use limitations" all refer to situations in which there is hardware installed within a computer system for which a user does not have use rights, but for which use rights may generally be obtained, either permanently or temporarily at some cost or under some conditions.

A "computer" is a machine that manipulates data in accordance with instructions. A "program" is an ordered series of computer-executable instruction. As used herein, a "program" is inherently tangibly embodied in computer-readable media. A "server" is a computer that provides services, e.g., serves web pages to or responds to database queries from, other computers.

"Computer-readable media" refers to media that can be accessed by a computer and includes volatile and nonvolatile, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules or other data.

"Computer storage media" encompasses, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer.

"Communication media" encompasses computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of "computer-readable media".

"Reliability" herein refers to a measure indicating the likelihood of uninterrupted operation. Even though a one-bit error can be corrected, the fact it occurred increases the likelihood of a two- or three-bit error occurring. A sufficient frequency of one-bit errors portends a combination of errors that cannot be corrected without interruption. Also, data errors can be indicative of hardware degradation—so an excessive rate of one-bit errors can indicate a risk of device failure. Reliability indicating data can include the fact that an error occurred, even though the error was correctable. Of course, errors causing interruptions can indicate unreliability even though handled, e.g., through an interrupt routine. In addition to error corrections, retransmission requests can indicate a problem with data transmitted by a communications device. Accordingly, retransmit requests can be used as reliability indicators.

Workload "priority" refers to a user evaluation of the criticality of a workload's need for hardware resources. A time-critical computation is normally given a higher priority than an event logging process. A high priority workload need not be more important than a relatively low priority workload in respects other than the extent to which its access to resources needs to be secured.

"Computer resources" encompasses hardware and other computer resources. Hardware resources encompasses processors, storage media, and communications devices. Other resources include licenses to use hardware and software. Allocation of computer resources to workloads can involve: 1) assigning a resource to a partition in which the workload is running; or 2) migrating a workload to a partition owning that resource. Of course, a partition is itself a computer resource that includes other computer resources. "Reliability-indicating events" can encompass both fatal and non-fatal errors. The present invention provides for quarantining in response to any type of intermittent and recoverable error, especially with increasing occurrence. Repairable processor cache errors or transient I/O path errors or increasing numbers of bad blocks on a disk drive are three that come easily to mind. The historical reliability indicators could also be fatal errors, or non-data errors that require unusual number of service events such as fans and power supplies. In the case of fans and power supplies there would be no data or single bit or double bit errors. Another type of reliability indicating events would be requests from an external communications device for a partition to retransmit data.

If a partition has shown fatal crashes in its history, the system could quarantine the partition and not run any application in the future or at least recognize that another fatal error may occur. If the history for a partition, server, rack or any other group of servers show non-fatal errors, fatal errors, or even an unusual number of service events for errors already mentioned but also errors like power supply failures, fan failures, IO failure, etc, the workload manager can quarantine any of these to either put no applications or only non-critical applications on these servers. The invention provides for repairing and replacing quarantined partitions, servers, and racks, or not repairing them.

While the foregoing example emphases migrating a workload, it is also possible to reallocate hardware without software migration. For computer systems that allow hardware to be shifted between partitions, a defective ECC memory module could be shifted out of a partition serving a critical workload. If desirable, the memory could be shifted to a partition running a less critical workload. Also, an unreliable component can be exchanged with a reliable reserved component in a system having use-rights limitations. While the foregoing addresses individual servers, the present invention also provides for inactivating or otherwise quarantining entire multi-partition servers and racks of servers. In fact, the invention provides for systems with, for example, hundreds of quarantined servers that are not being used unless there are unusual demands due to an application peak. These and other variations upon and modification to the illustrated embodiments are provided for by the present invention, the scope of which is defined by the following claims.

What is claimed is:

1. A computer system comprising:
   hardware resources for running respective workloads;
   a monitor for monitoring reliability indicating events by generating current reliability data indicating likelihoods of interrupted operation for respective ones of said workloads;
   a history for compiling said current reliability data to yield historical reliability data;
   a workload manager for allocating said hardware resources to said workloads as a function of said historical reliability data.

2. A computer system as recited in claim 1 wherein said computer resources are arranged in partitions that serve as containers for said workloads and at least some of said hardware resources, said partitions including a first set of one or more relatively reliable partitions and a second set of relatively unreliable partitions, said workload manager migrating a first workload from said first set to said second set.

3. A computer system as recited in claim 2 wherein said workload manager migrates a second workload to said second set.

4. A computer system as recited in claim 3 wherein said second workload has a lower priority than said first workload.

5. A computer system as recited in claim 1 wherein said reliability indicating events include digital data error corrections.

6. A computer system as recited in claim 1 wherein said current reliability data corresponds to events including external requests to retransmit data.

7. A computer system as recited in claim 1 wherein said workload manager automatically removes a functioning but unreliable component from said system.

8. A method comprising:
monitoring a computer system for events indicating unreliability so as to generate historical reliability data indicating likelihoods of interrupted operation for workloads executing on said computer system;
allocating computer resources to said workloads as a function of said historical reliability data.

9. A method as recited in claim 8 wherein said allocating involves migrating a first workload from a partition indicated as unreliable by said data, said partition serving as a container for at least some of said computer resources.

10. A method as recited in claim 9 wherein said allocating involves migrating a second workload to said partition.

11. A method as recited in claim 10 further comprising a step of setting management policies specifying that said first workload has a higher priority than said second workload.

12. A method as recited in claim 8 further comprising deactivating computer resources indicated by said data as unreliable.

13. A method as recited in claim 8 wherein said events indicating unreliability include error-correction events.

14. A method as recited in claim 8 wherein said events indicating unreliability include external requests to retransmit data.

15. A computer product comprising non-transitory computer-readable storage media encoded with computer instructions configured for, when executed by a processor:
monitoring a computer system for events indicating unreliability so as to generate historical reliability data indicating likelihoods of interrupted operation for workloads executing on said computer system; and
allocating computer resources to said workloads as a function of said historical reliability data.

16. A product as recited in claim 15 further comprising quarantining computer resources indicated by said data as unreliable.

17. A product as recited in claim 15 wherein said events indicating unreliability include failures of non-data-handling components.

18. A product as recited in claim 15 wherein said events indicating unreliability include repairable cache errors.

19. A product as recited in claim 15 further wherein said allocating involves migrating a first workload from a partition indicated as unreliable by said data.

20. A product as recited in claim 19 wherein said allocating involves migrating a second workload to a partition indicated as unreliable by said data.

21. A product as recited in claim 20 wherein said computer instructions are further configured to execute a step of setting management policies specifying that said first workload has a higher priority than said second workload.

* * * * *